R. A. BRADLEY.
FOCUS FINDER FOR PHOTOGRAPHIC CAMERAS.
APPLICATION FILED DEC. 8, 1916.
1,322,526.
Patented Nov. 25, 1919.
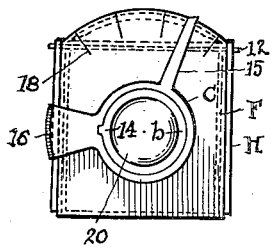
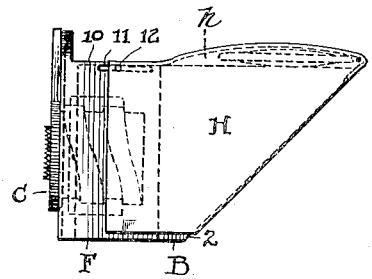
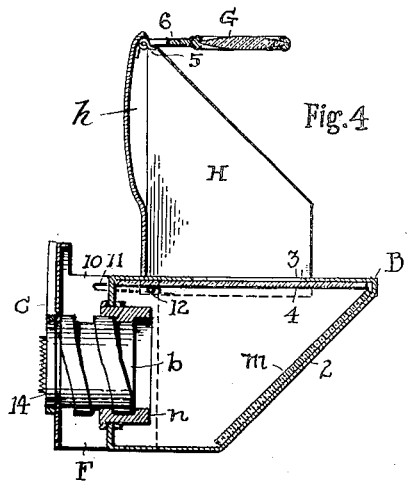
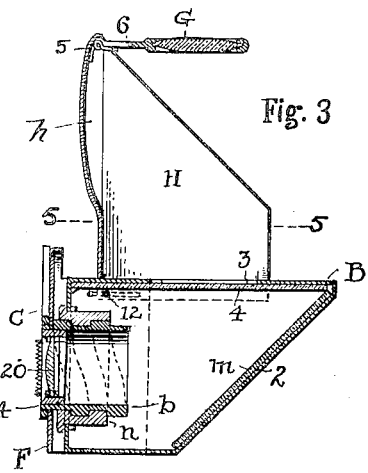
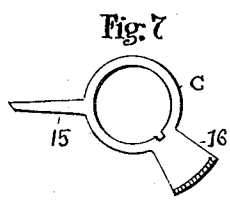
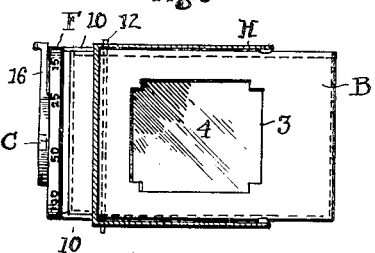
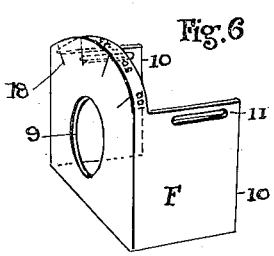
Inventor
R. A. Bradley

UNITED STATES PATENT OFFICE.

RAY A. BRADLEY, OF ST. LOUIS, MISSOURI.

FOCUS-FINDER FOR PHOTOGRAPHIC CAMERAS.

1,322,526.  Specification of Letters Patent.  Patented Nov. 25, 1919.

Application filed December 8, 1916. Serial No. 135,735.

*To all whom it may concern:*

Be it known that I, RAY A. BRADLEY, citizen of the United States, residing at St. Louis, in the State of Missouri, have invented certain new and useful Improvements in Focus-Finders for Photographic Cameras, of which the following is a specification.

This invention relates to what I prefer to call a focus finder for photographic cameras, and the device is of a camera obscura type, adapted to be used with photographic cameras to locate and determine the distance of objects to be photographed, all substantially as shown and described and particularly pointed out in the claims.

In the accompanying drawings, Figure 1 is a front elevation of the device, and Fig. 2 is a side elevation thereof, the hood being closed in both views. Fig. 3 is a sectional elevation of the device front to rear with the hood raised, and Fig. 4 is a substantially similar view to Fig. 3, but with certain parts somewhat differently positioned, as hereinafter described. Fig. 5 is a horizontal sectional plan taken just above the frosted plate and sectioning the hood at its base line 5—5 Fig. 2. Fig. 6 is a perspective view of the follower hood, and Fig. 7 is an elevation of the focusing lever.

As thus shown the invention consists in an attachment for photographic cameras of the camera obscura type, and the object of the invention, as above indicated, is to provide a device having means for adjusting the focus to objects at varying distances therefrom, and which is provided with a magnifying lens for enlarging the image reflected to such size as to enable the operator to more closely approximate an idea of what the camera lens will reflect on the photographic surface. The device can therefore be used as an attachment with or on photographic cameras generally not only as a sight-box or finder but also as a focus finder.

Having reference now to the details of the attachment, B represents the body or box of the device, which may be made of aluminum, steel or other light sheet metal or even of wood, and the slidable front follower or hood F and the pivotally mounted hood H may be made of the same material or its equivalent.

The said body is shown as having a flat rear portion 2 inclined to an angle of about 45 degrees inward from top to bottom and carrying a mirror $m$ or other reflecting or refractive surface, and the flat top of the box has an opening 3 therein, Fig. 5, which is covered by a ground glass or other translucent plate or screen 4.

The said hood H also has closed inclined sides so as to darken the space about the frosted or ground glass plate 4, and a magnifying glass or lens G is supported in a suitable bracket or frame 6 pivoted or hinged upon the so-called top portion of hood H and a spring 5 is adapted to raise and support said lens in a horizontal plane when the hood is raised, as in Figs. 3 and 4. When the hood H is closed or folded, as in Fig. 2, the inclined edges of the side thereof match with the inclined rear surface of body B and economize space, and the said bracket 6 is folded within the recessed portion $h$ of the front wall of the hood, and thereby concealed and protected.

The so-called follower hood F is fashioned as seen in perspective, Fig. 6, and provided with a circular opening or aperture 9 at its front and center and side wings 10 adapted to lap over upon the sides of body B, and the said sides have each a slot 11 engaged on the pin or rod 12 which extends through the top of said body near its front and confines said follower hood within limits and serves also as a pivot support for the hood H.

The opening or aperture 9 in the face of follower hood or member F is of sufficient diameter or size to receive the externally-threaded lens barrel $b$ and the said slots provide for a back and forth sliding movement of said hood member to accommodate the positions of the said barrel as it is rotated to obtain or find the desired focus. To these ends the said barrel is rotatably mounted in said hood member at its outer end and serves also to carry the same back and forth, and otherwise is engaged in the internally-threaded nut $n$ permanently fixed in an opening in body B corresponding to the opening 9 in the follower member F.

A focusing lever and pointer C of substantially the shape shown in Fig. 6 serves the double purpose of means to operate barrel $b$ and to indicate distances, and has a ring-shaped body adapted to make a press fit over the shoulder 14 on the outer end of barrel b, or is secured thereto by equivalent means, and has a pointer or finger 15 and a controlling arm or grip 16 projecting therefrom at different angles. The said finger points to dial scores or marks 18 or the like radially on the face or the curved top of follower member F and the curved top surface is numbered successively to tell the distance in feet from an object on which the focus is obtained so that the image on the ground glass and the distance in feet can be seen practically simultaneously.

The lens barrel contains a lens 20 in its outer portion, and the said barrel may be made of brass, aluminum or other suitable material, and has a double or triple quick thread so as to give speedy adjustments.

The operation of the device as described seems to be obvious. The object lens 20 in said barrel projects the image upon the mirror m from which the image is reflected upon the screen 4 in a righted position and where it is shown to the operator through the magnifying glass or lens G in enlarged form. Having these parts in working relations as described, the lens barrel b is readily adjustable for diminishing or enlarging the distance between the lens in said barrel and the reflector or mirror m and thus varying the focus.

Equivalent means for operating the lens barrel b may readily be suggested, as by a rack and pinion, the object in any case being to make such adjustment as will give sharply defined images on the ground glass surface 4, whatever their distance from the camera or finder, and this result may be variously obtained.

What I claim is:

1. An attachment for cameras, comprising a body having an opening in its top and a screen horizontally disposed in said opening, a hood having rigid side walls and a recessed front wall pivoted on said body in folding relation to said screen, a magnifying lens pivoted on said hood and adapted to occupy the recess in said front wall and having a spring adapted to unfold the lens into a horizontal position above said screen when the screen is unfolded, an inclined mirror in said body adapted to project an image onto said screen, and a longitudinally-adjustable barrel having an object lens opposite said mirror and axially parallel with the face of said screen.

2. An attachment for cameras as described, comprising a body having a mirror set at an inclination in the rear thereof and an object lens opposite the same in said body, a screen fixed in the top of said body in reflecting position from said mirror, a rotatably adjustable barrel in the front of said body carrying said object lens and a follower hood slidably connected with said body and operatively engaged by said barrel and provided with focusing marks adjacent the end of the barrel.

3. The attachment described comprising a body and means therewith to locate the distance of objects to be photographed comprising a follower hood slidably mounted at its sides on the said body and an externally threaded barrel engaging said hood, a nut fixed in said body in which said barrel is rotatably supported, an object lens in said barrel and a mirror opposite said lens, a screen in the top of said body, and a spring-pressed pivoted lens adapted to unfold parallel with said screen to magnify the object to the operator.

4. A focus finder adapted to locate and determine the distance of objects to be photographed, comprising a body, a rotatable barrel in said body and an object finding lens therein, a follower hood operatively connected with said barrel and having slotted sides slidably secured on the sides of said body and provided with a distance indicating dial on its face, means to rotate said barrel and a pointer on the front of said barrel opposite said dial, a three-sided hood hinged to fold over the top of said screen and adapted to unfold at right angles in respect thereto, and a magnifying lens pivoted to the free end of said hinged hood and having a spring to unfold the lens when the hood is unfolded.

Signed at St. Louis, in the county of St. Louis, and State of Missouri, this 6th day of November, 1916.

RAY A. BRADLEY.